(12) United States Patent
Joly

(10) Patent No.: US 7,853,358 B2
(45) Date of Patent: Dec. 14, 2010

(54) METHOD AND APPARATUS FOR CONTROLLING DISPLACEMENTS OF A MOVING PORTION OF A MULTI-AXIS ROBOT

(75) Inventor: Luc Joly, Faverges (FR)

(73) Assignee: Staubli Faverges, Faverges (FR)

( * ) Notice: Subject to any disclaimer, the term of this patent is extended or adjusted under 35 U.S.C. 154(b) by 682 days.

(21) Appl. No.: 10/582,297

(22) PCT Filed: Dec. 17, 2004

(86) PCT No.: PCT/FR2004/003291

§ 371 (c)(1),
(2), (4) Date: Oct. 2, 2007

(87) PCT Pub. No.: WO2005/062143

PCT Pub. Date: Jul. 7, 2005

(65) Prior Publication Data

US 2008/0147238 A1      Jun. 19, 2008

(30) Foreign Application Priority Data

Dec. 19, 2003   (FR) .................................. 03 15068

(51) Int. Cl.
*B25J 9/00* (2006.01)
(52) U.S. Cl. .......................................... 700/260; 901/2

(58) Field of Classification Search .................. 700/245, 700/260; 901/1, 2
See application file for complete search history.

(56) References Cited

U.S. PATENT DOCUMENTS

| | | | | |
|---|---|---|---|---|
| 4,773,025 A | * | 9/1988 | Penkar et al. ................ | 700/261 |
| 4,967,127 A | * | 10/1990 | Ishiguro et al. ............. | 318/571 |
| 2003/0200042 A1 | * | 10/2003 | Gan et al. .................... | 702/105 |
| 2004/0093119 A1 | * | 5/2004 | Gunnarsson et al. ........ | 700/245 |

FOREIGN PATENT DOCUMENTS

| | | |
|---|---|---|
| EP | 0349291 | 1/1990 |
| JP | 2001-105152 | 4/2001 |

* cited by examiner

*Primary Examiner*—Khoi Tran
*Assistant Examiner*—Rodney King
(74) *Attorney, Agent, or Firm*—Dowell & Dowell, P.C.

(57) ABSTRACT

The inventive method consists in supplying motion instructions (300) at least including information about the path geometry (320) and load instructions (310) to a path generator (400), calculating an allied load signal (800), transmitting said applied load signal (800) to the path generator (400), calculating motion instructions (500) along the path in such a way that the deviation between the projection of the applied load on a tangent to said path and the projection of the instruction on said tangent is minimized and in transmitting said motion instructions (500) to means for actuating a robot (600). A device comprising means (200, 400, 700) for carrying out said control is also disclosed.

6 Claims, 4 Drawing Sheets

METHOD AND APPARATUS FOR CONTROLLING DISPLACEMENTS OF A MOVING PORTION OF A MULTI-AXIS ROBOT

The invention relates to a method and to apparatus for controlling displacements of a moving portion of a multi-axis robot along a path.

In the field of controlling multi-axis robots, it is known to control a multi-axis robot by means of PID (proportional-integer-derivative) type servo-control loops acting on position, speed, and current, in order to cause the terminal portion of a robot, which may be carrying a tool or a grip, to move along a path of determined shape and velocity profile. It is also known to control such a robot by reducing the stiffness of the servo-control on each axis in order to enable the position of the arm to be varied as a function of the forces of interaction between the moving portions of the robot and their environment. In particular, it is known, e.g. from U.S. Pat. No. 5,742,138, to use parameters to set the stiffness of a multi-axis robot arm in a rectangular coordinate system, to measure a position error, to calculate a force, and to correct the position of the moving portion of the robot so as to obtain a certain amount of flexibility in its terminal member. Such flexibility can be used for performing operations of handling parts for purposes such as polishing, deburring, or extracting from a press, in which a contact force can oppose the movement programmed for the robot.

It is also known to give a setpoint force in a rectangular coordinate system in order to implement an operation at a controlled force level along a path, e.g. for deburring or for polishing.

In known systems, provision is sometimes made for the path-programming interface to be capable of specifying parameters such as the velocity or the acceleration of the moving portion along its path, said parameters determining the position of the terminal portion of the robot arm along its path as a function of time.

It is also known from U.S. Pat. No. 4,874,997 to control a brushless motor for a robot joint numerically by using pulse-width modulation.

In those known systems, it is not easy to program a multi-axis robot so that the displacement path of its terminal portion can be controlled both in velocity and acceleration on the one hand, and so that a force tangential to the path at the point of contact between the moving portion and its environment is also controlled on the other hand, while simultaneously complying with velocity and acceleration values that are compatible with the mechanical structure of the robot.

EP-A-0 349 291 also discloses diverting a robot from the path it has taken in order to comply with a force setpoint as a function of the real shape of a part to be processed. In that example, force control is privileged over following the path, and that is not compatible with certain utilizations in which it is essential to follow the path accurately.

The invention seeks more particularly to satisfy those drawbacks by proposing a method in which the interactions between the environment and the moving portion of a robot, in particular a part or a tool carried thereby, are controlled accurately.

In this spirit, the invention relates to a method of controlling displacements of a moving portion of a multi-axis robot along a path, in which there are provided steps consisting in:
  providing movement instructions to a path generator, the instructions including at least information relating to the shape of the path and to force setpoints;
  calculating an external force signal representing at least one component of the force exerted by the moving portion on its environment;
  acting at a predetermined sampling frequency to provide the external force signal to the path generator;
  calculating, with the path generator and at a predetermined sampling frequency, movement setpoints along the path in such a manner as to minimize the difference between the projection of the external force onto the tangent of the path and the projection of the setpoint onto the tangent; and
  delivering the movement setpoints to a servo-control means enabling at least one axis of the robot to be set into movement in compliance with the movement setpoints.

The tangential force servo-control thus makes it possible to conserve the shape of the path while adapting the velocity of the moving portion to said path.

According to advantageous aspects, a method of controlling displacements of a moving portion of a multi-axis robot may incorporate one or more of the following characteristics:
  The external force signal is calculated from information representing the current flowing in at least one actuator of the robot.
  A step is provided consisting in using a dynamic model of said robot while calculating said external force signal.
  A step is provided consisting in supplying said path generator with at least one velocity limit value and/or at least one acceleration limit value for taking into account while calculating said movement setpoints, such that said setpoints comply with said limit value(s).

The invention also provides an apparatus enabling the above-described method to be implemented, and more specifically, an apparatus comprising:
  a path generator suitable for calculating movement setpoints as a function of movement instructions including at least information relating to the shape of the path and to its force setpoints; and
  a force estimator suitable for generating an external force signal representing at least one component of the force exerted by said moving portion on its environment and for delivering said signal to said path generator at a predetermined sampling frequency, where said path generator is suitable for calculating said movement setpoints along said path at a predetermined sampling frequency in such a manner as to minimize the difference between the projection of the external force on the tangent to the path and the projection of the force setpoint onto said tangent, said movement setpoints being delivered to a servo-control means enabling at least one axis of said robot to be set into movement.

Advantageously, the apparatus comprises program interpreter means suitable for executing programs containing movement instructions enabling at least the shape of the path and force setpoints to be specified.

The invention can be better understood and other advantages thereof appear more clearly in the light of the following description of an implementation of a method in accordance with the principle of the invention, given purely by way of example and described with reference to the accompanying drawings, in which.

Figure 1:
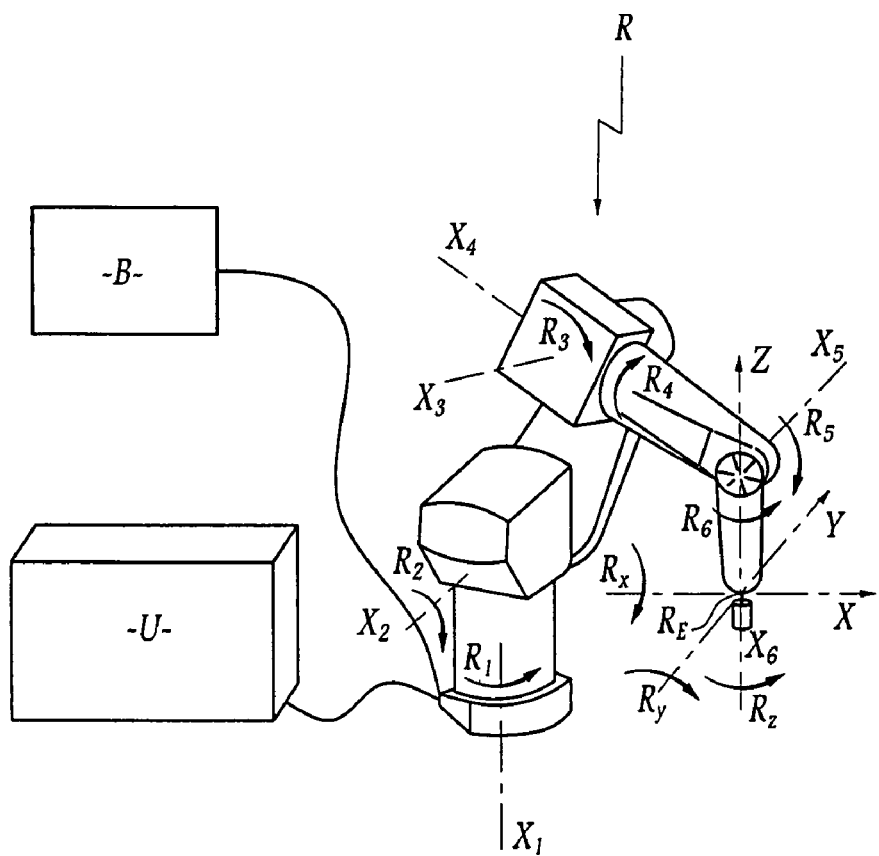
FIG. 1 is a diagram showing the principle of a multi-axis robot moving a milling tool along a path while implementing a method in accordance with the invention.

The robot R shown in FIG. 1 is a multi-axis robot having six joints. It can move with six degrees of freedom. The robot R can be controlled in Cartesian mode, in which case its degrees of freedom can be three degrees of freedom in translation along the directions of three axes X, Y, and Z, and three degrees of freedom in rotation $R_x$, $R_y$, and $R_z$ about said axes. The robot may also be controlled in joint mode, in which case the degrees of freedom can be six rotations $R_1$, $R_2$, $R_3$, $R_4$, $R_5$, and $R_6$ about the six hinge axes $X_1$, $X_2$, $X_3$, $X_4$, $X_5$, and $X_6$ of the joints.

The robot is associated with a control unit U which controls this operation during stages of training and utilization.

A manual control console B may also be used during training stages.

In the example shown, the robot R carries a tool O such as a milling cutter, which is to be displaced along a path T.

Figure 2:
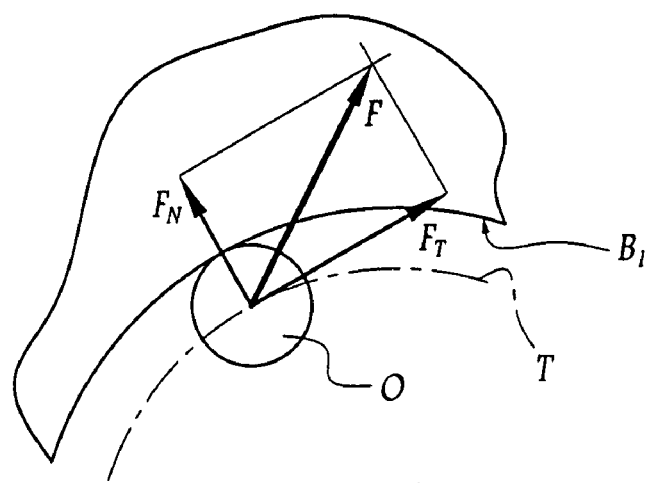
FIG. 2 is a diagram showing the principle whereby forces are resolved at a moving portion of the FIG. 1 robot.

As can be seen more particularly in FIG. 2, it is considered that the tool O is displaced by the robot R along the edge $B_1$ of a part to be milled. The path T is generally parallel to said edge. The force exerted by the tool O against the edge $B_1$ is written F. The component of this force that is tangential to the path T is written $F_T$, and the component of said force that is normal to the path T is written FN.

In accordance with the invention, the value of the tangential component $F_T$ is used in the method of controlling the displacements of the tool O.

In the description below, F is used broadly and represents the vector of the torques in the joints of the robot arm or the torsor of external forces including the Cartesian forces Fx, Fy, Fz, and the Cartesian torques Mx, My, Mz.

Figure 3:
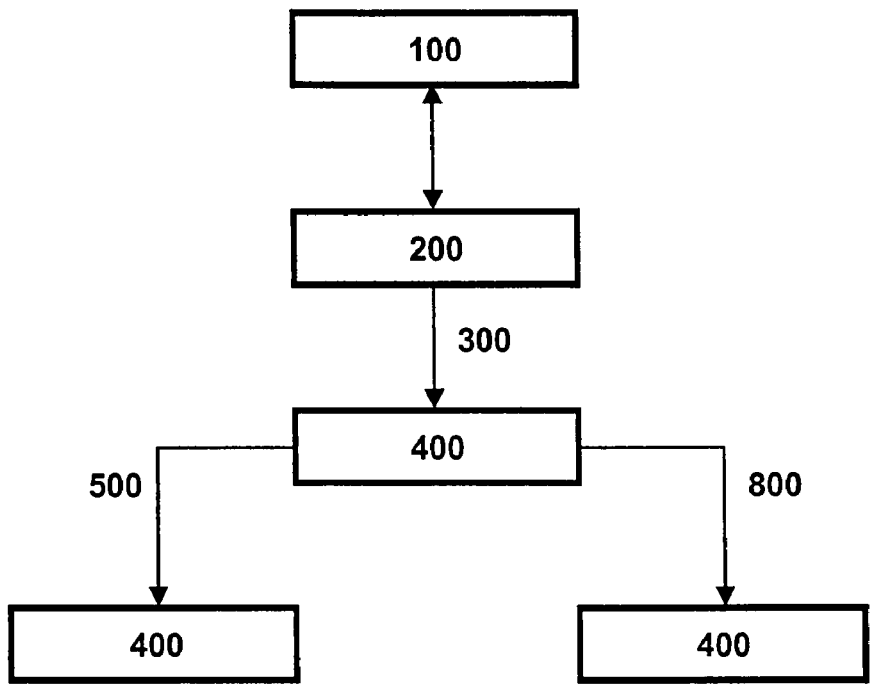
FIG. 3 is a block diagram showing the general operation of the invention.

As shown in FIG. 3, the programming environment 100 enables the user of the system to program the robot in such a manner that it performs the desired operations. These operations are described by programs. The programming environment enables the successive positions to be reached by the robot to be trained, it enables programs to be written for describing the sequencing of movements, it enables the programs to be debugged, it enables them to be launched, to be stopped, etc.

In order to execute the programs, the programming environment makes use of a program interpreter 200. This interpreter executes the programs for implementing a task by the robot. Amongst other things, the programs executed contain instructions 300 known as movement instructions. They describe the types of movement to be performed by the robot (straight line, circle, . . . , etc.), and also the various parameters characterizing them (target point, velocity, force, . . . ).

The movement instructions 300 are transferred to the path generator 400. The path generator serves to execute them, i.e. it serves to generate movement setpoints 500 regularly (typically once every 4 milliseconds (ms)), as a function of movement type and movement parameters. These movement setpoints 500 represent the path that is to be followed by the robot at each instant. The servo-controlled industrial robot 600 comprises an industrial arm having six axes together with its servo-control system. The servo-control system is designed in such a manner as to control the six motors of the robot (one for each axis) in such a manner that the path actually followed by the robot follows the path defined by the movement setpoint 500 as closely as possible.

In certain applications, the terminal member of the industrial robot 600 interacts mechanically with its environment: for example, the part it is milling. The external force estimator 700 constitutes means for obtaining a signal referred to as the external force 800 that is representative of the value and the direction of the forces exerted by the robot on its environment. This signal is delivered to the path generator 400 in real time (typically once every 4 milliseconds (ms)). The path generator uses this return information to modify the movement setpoints so as to regulate the interaction forces.

The programming environment includes a control console that enables the robot to be displaced in an interactive mode, so as to make it possible to train the various positions that are to be taken by the robot. It also serves as a programming interface for writing and debugging programs. The language used for writing such programs is a text language, but other types of language (e.g. graphics languages) could be used in the context of the invention.

The language used contains instructions of the kind that are common in robot programming languages, serving to specify different types of movement, to control their velocities and accelerations, and also to control how they are sequenced.

By way of example, there follows a description of two other instructions that relate to the invention.

The instruction:

MOVEJF (position, tool, params, force) specifies that the robot must displace the tool it is carrying and as defined by the parameter "tool", from the final position of the preceding movement to the position defined by the "position" parameter. The displacement is performed in joint mode, i.e. there is a constant proportionality ratio between the displacements of each axis during the movement. The "params" parameter specifies the velocities and the accelerations that are not to be exceeded during the movement. It also specifies whether the movement is to be run on into the following movement. The "force" parameter specifies the value desired for the force that is tangential to the path during the movement. Insofar as the limits on velocity and acceleration as defined by "params" are not reached, the robot should adapt its displacement along the path in such a manner as to maintain the tangential force at a value that is as close as possible to the value specified by the "force" parameter.

The instruction:

MOVELF (position, tool, params, force) is similar. The only difference is that the movement needs to be performed in a straight line.

Similar instructions can easily be imagined for defining paths that are circular, or that are defined by splines, or otherwise, . . . .

It is important for the invention that these instructions define firstly the shape of the path that the robot is to follow, and secondly the value of the tangential force that the robot is to exert during its displacement.

The program interpreter 200 serves to execute the programs generated using the development environment. To execute the movement instructions, it verifies the validity of the parameters specified by the user, and then transmits the movement instruction 300 to the path generator 400. The movement instructions 300 contain information coming from values specified in the program, namely:

310—Definition of the shape of the path: a flag indicates the type of path (joint or straight line). If the type is "joint", then the joint coordinates q0 of the starting point and q1 of the target point are given. If the type is "straight line", then the Cartesian coordinates x0 of the starting point and x1 of the target point are given;

320—Tangential force setpoint: this is the desired value des for the norm of the Cartesian force exerted by the end of the robot on its environment;

330—Velocity limit: the limiting value vmax for the norm of the Cartesian velocity at the end of the robot; and 340—Acceleration limit: the limiting value amax for the norm of the Cartesian acceleration at the end of the robot.

Figure 4:
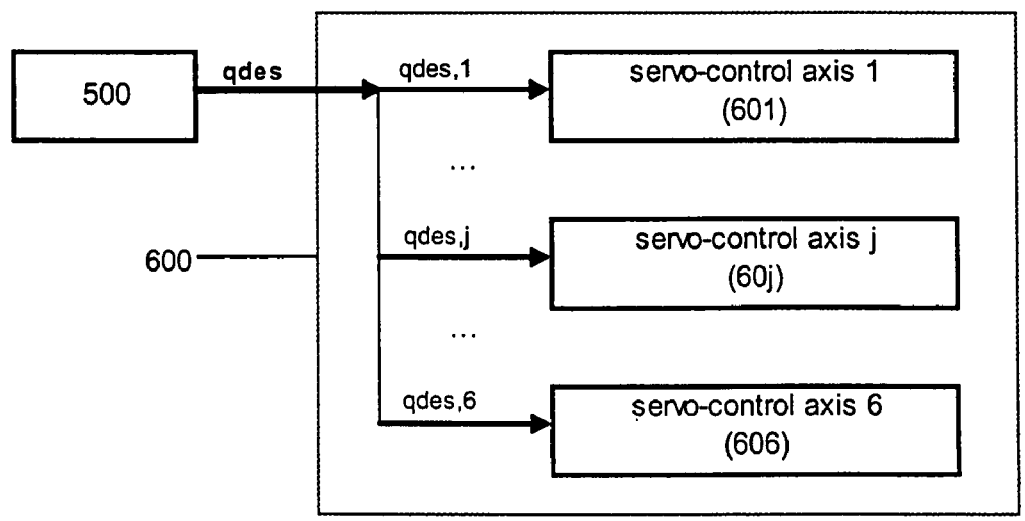
FIG. 4 is a block diagram showing the transfer of position setpoints to the corresponding servo-control system for each motor.

In the embodiment described herein, the movement commands 500 are constituted by the angular positions qdes of the six motors. They are updated by the path generator once every 4 ms. Each of the six position setpoints qdes1, qdes2, . . . , qdes6, is transferred to the corresponding servo-control system for each of the motors 601, 602, . . . , 606, as shown in FIG. 4.

Figure 5:
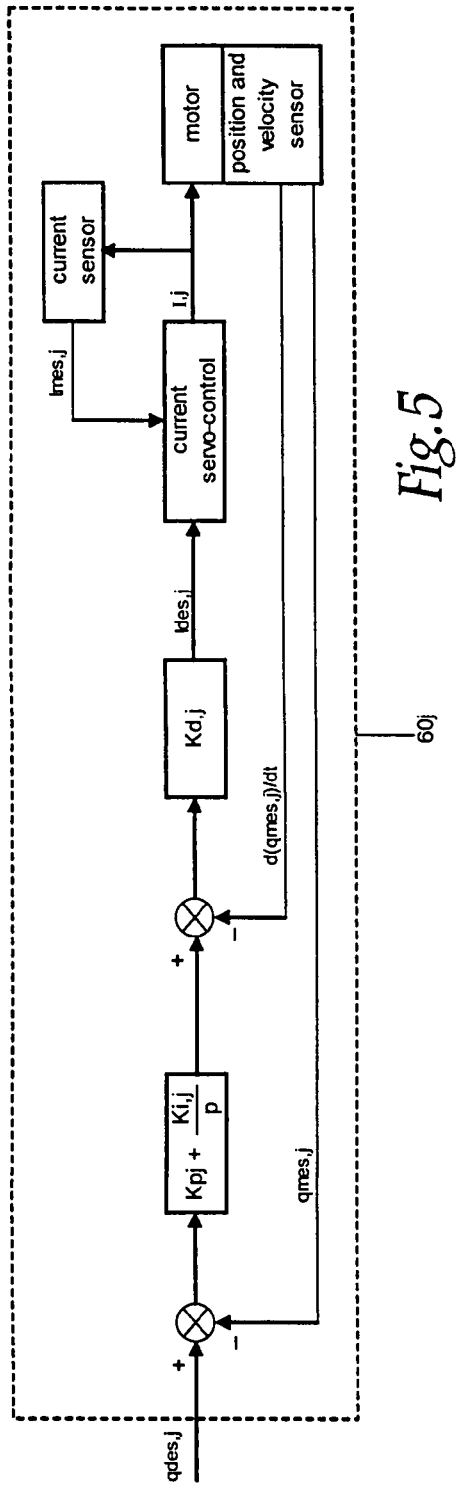
FIG. 5 is a block diagram showing the servo-control for each motor.

Each motor is fitted with a position and velocity sensor. The servo-control of each motor is of the proportional-integer-derivative (PID) type. In FIG. 5, qdes,j is the position setpoint on the axis j, qmes,j is the measured position, Kp,j, Ki,j, and Kd,j are the respective gains of the PID, Ides,j is the current setpoint, Imes,j is the measured current, and p is the Laplace variable.

Other position servo-control techniques can also be used in the context of the present invention. For example, servo-control may be performed by the decoupling and linearization technique. Under such circumstances, the servo-control is no longer performed axis by axis. In the present example, the movement setpoints 500 are the angular positions desired for each motor. It is also possible to use the position and the velocity desired for the terminal member, as expressed in Cartesian coordinates. The movement setpoints may also be successive position increments, or the velocities desired for each motor at each instant. The point that is important for the invention is that the path generator 400 acts in real time to calculate the path to be followed by the robot and that a servo-control system ensures that the robot follows that path as closely as possible.

Numerous means are available for estimating the force exerted by the robot on the outside in the context of the present invention. The most simple consists in placing a force sensor at the end of the robot. Under such circumstances, the outside force 800 is expressed in Cartesian coordinates. It is also possible to use force sensors or torque sensors placed at various locations on the robot.

Figure 6:
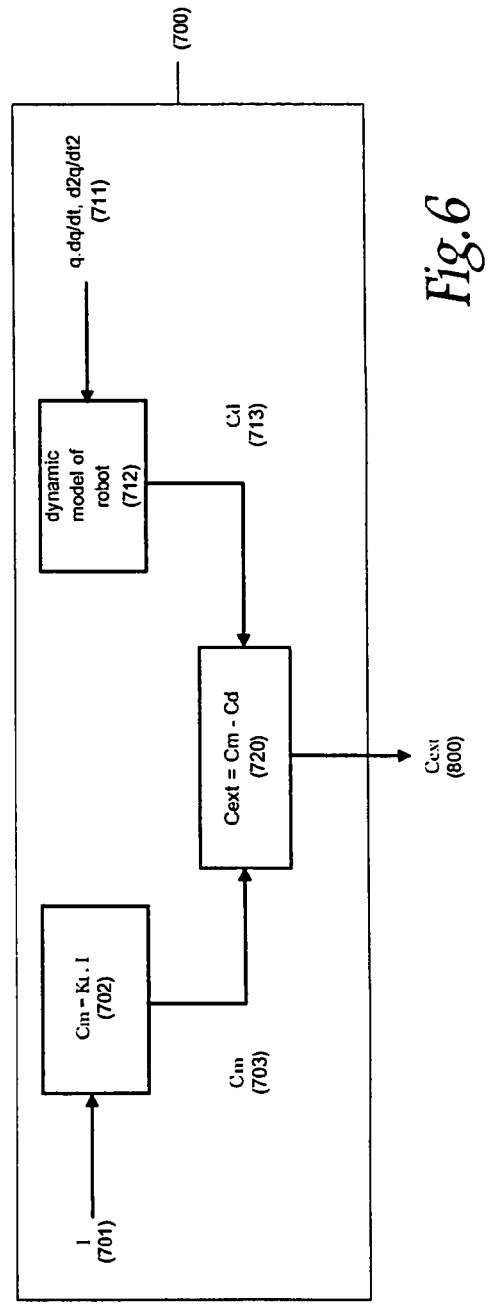
FIG. 6 shows the method used for estimating external forces.

In the implementation proposed and shown in FIG. 6, a solution is desired that enables the external force to be estimated by using position servo-control variables.

The method used requires a value 701 representative of the current I flowing in each motor. In this example, this is equal to the measured current Imes used in the servo-control system.

$I=Imes=[Imes,1\ Imes,2\ \ldots\ Imes,6]$

It would be equally possible to use the current control signal, i.e.:

$I=Ides=[Ides,1\ Ides,2\ \ldots\ Ides,6]$ or any other measured or calculated variable representative of the currents flowing in the motors.

The motors used are brushless motors. The simplest model 702 for a motor of this type consists in considering that the delivered torque Cm 703 is proportional to the current flowing through the motor, i.e.:

$Cm=Kt.I$

In this expression, I and Cm are vectors containing information relating to each of the axes, and Kt is a diagonal matrix. More complex models could be used as 702.

Furthermore, the method used requires signals that are representative of the movements of the robot 711, e.g. the positions, velocities, and accelerations of each of the motors as represented respectively by the vectors q, dq/dt, and $d^2q/dt^2$. In this example, these values are deduced from the measurements of the sensors used by the servo-control system and from their derivatives.

$q=qmes$ $dq/dt=d(qmes)/dt$ $d^2q/dt^2=d^2(qmes)/dt^2$

It would also be possible to use the position setpoints and their derivatives: qde, d(qdes)/dt, $d^2(qmes)/dt^2$.

On the basis of this information, and of a dynamic model 712 of the robot arm, e.g. established using Newton-Euler equations, a vector Cd is calculated representing the torques that each motor of the robot ought to be exerting in theory, assuming that the robot were not exerting any external force 713.

By taking the difference at 720, a vector Cext 800 is deduced that constitutes an estimate of motor torques corresponding to the forces exerted by the robot on its environment 800:

$Cext=Cm-Cd$

Figure 7:
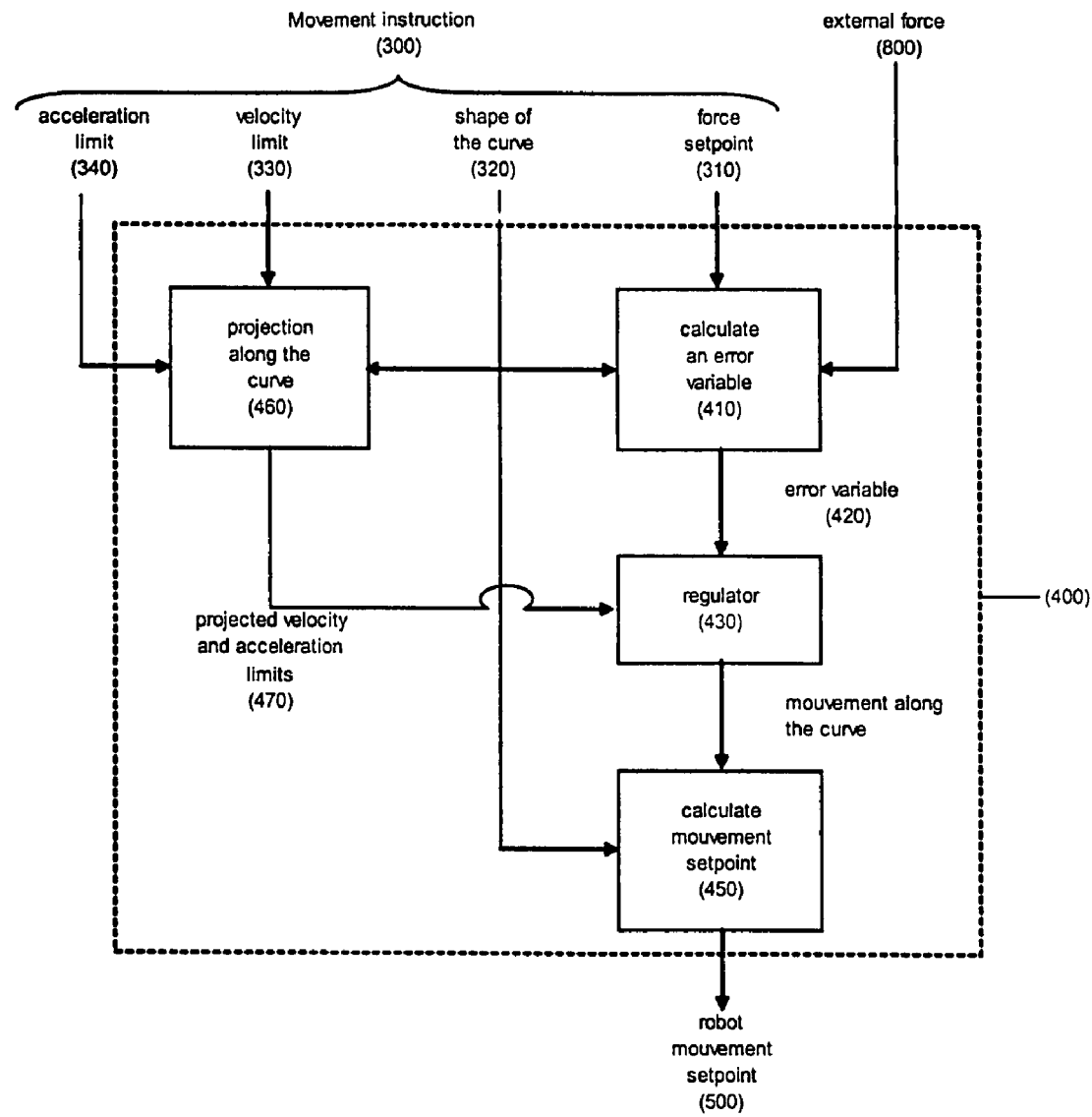
FIG. 7 shows the algorithm used by the path generator for generating movement setpoints.

FIG. 7 shows how the algorithm used by the path generator can be split up into four portions:

Starting with the tangential force setpoint 310, the external force 800, and the shape of the curve 320, a scalar error variable 420 is calculated at 410. The velocity and acceleration limits 330 and 340 are projected at 430 onto the curve 320. On the basis of the projected velocity and acceleration limits 470, and also on the basis of the error variable 420, a regulator 430 calculates the desired movement along the curve 440. The movement setpoints 500 of the robot are then calculated at 450 from the defined shape of the curve 320 and the defined movement along the curve 440.

Each of these four portions is described below:

A) Calculating the Error Variable (410-420): Movement in a Straight Line

The calculation of the error variable 420 is described below for movement in a straight line. The calculations given below consist in calculating the projection onto the curve 320 of the difference between the force setpoint 310 and the external force 800.

During a movement in a straight line, the Cartesian position x of the robot (a vector) can be written in parametric form as follows:

$x=x0+s.(x1-x0)$ where x0 is the Cartesian position from which the movement starts, x1 is the Cartesian target position, and is a scalar parameter lying in the range 0 to 1. The above equation can be rewritten in the following form:

$x=f(s)$ (Eq. 1)

By differentiating this equation, the following is obtained:

$v=dx/dt=df/ds.ds/dt$ (Eq. 2)

In this equation, df/ds is a Cartesian vector tangential to the curve. The Cartesian vector:

$$u=(df/ds)/\|df/ds\|$$

is unitary and tangential to the curve.

In this example, the force setpoint 300 is the norm of the Cartesian tangential force. The desired Cartesian force vector is thus given by:

$$Fdes=fdes.u \quad \text{(Eq. 3)}$$

The external force 800 is given by the vector of the joint torques Cext. This value can be transformed into Cartesian coordinates by using the following formula:

$$Fext=J^{-t}.Cext \quad \text{(Eq. 4)}$$

where $J^{-t}$ is the inverse of the transpose of the kinematic matrix of the robot.

The selected command variable 420, written eps, is the difference between the desired tangential force and the external force, as projected onto the tangent of the path, i.e.:

$$eps=u^t.(Fdes-Fext)$$

This calculation remains valid regardless of the function f used (circle, spline, etc. . . . ), providing it can be differentiated, which means that its tangent can be defined at all points.

This calculation has been performed for the special case where the force setpoint 300 is the norm of a Cartesian force vector and the external force 800 is given in joint coordinates. By using appropriate change-of-coordinate formulae, e.g. replacing equation Eq. 3 and equation Eq. 4, it is possible to handle the situation in which this which is given in any coordinate system.

B) Calculating the Error Variable (410-420): for Joint Movement

When handling joint movement, the joint position q of the robot can be written in parametric form as follows:

$$q=q0+s.(q1-q0)$$

where q0 is the joint position at the start of the movement, q1 is the target joint position, and s is scalar parameter lying in the range 0 to 1. The above equation can be rewritten in the form:

$$q=g(s)$$

The corresponding Cartesian position is given by:

$$x=k(q(s))$$

where k is the direct geometrical model of the robot.

The joint movement can thus be handled like the Cartesian movement, by selecting the function f such that:

$$f(s)=k(q(s))$$

C) Projecting the velocity and acceleration limits along the curve (460)

In this example, the velocity limits are given in Cartesian coordinates. In other words, it is desired that the norm of the velocity v of the robot should be less than a given velocity vamx, and the norm of the Cartesian acceleration dv/dt should be less than a given acceleration amax.

The following values are defined:

$$(ds/dt)_{max}=\min(vmax/\|df/ds\|; .\mathrm{sqrt}(amax/\|df/ds\|)) \quad \text{(Eq. 5)}$$

$$(d^2S/dt^2)_{max}=(amax-\|df/ds\|(ds/dt)_{max})/\|d^2f/dS^2\| \quad \text{(Eq. 6)}$$

in which c is a constant such that $0 \leq c \leq 1$ sqrt( ) designates the square root function.

Assuming the following applies:

$$|ds/dt| \leq (ds/dt)_{max}$$

$$|d^2s/dt^2| \leq (d^2S/dt^2)_{max}$$

Then, from equation Eq. 2, the following applies:

$$\|v\| = \|df/ds \cdot ds/dt\|)$$
$$= \|df/ds\| \cdot \|ds/dt\|$$
$$\leq \|df/ds\| \cdot (ds/dt)_{max}$$

Thus, from equation Eq. 5, the following applies:

$$\|v\| \leq vmax$$

In addition, by differentiating equation Eq. 2, the following is obtained:

$$a=df/ds.d^2/dt^2+d^2f/ds^2.(ds/dt)^2$$

whence $$\|a\|=\|df/ds.d^2s/dt^2+d^2f/ds^2.(ds/dt)^2\| \leq \|df/ds\|.\|d^2s/dt^2\|+ \\ d^2f/ds^2\|.|ds/dt|^2 \leq \|df/ds\|(d^2s/dt^2)_{max}|+\|d^2f/ds^2\| \\ (ds/dt)_{max}^2$$

By using the definitions of equations Eq. 5 and Eq. 6, the following is obtained:

$$\|a\| \leq amax$$

The values $(ds/dt)_{max}$ and $(d^2S/dt^2)_{max}$ thus define constraints on the derivatives of s, which ensure that the Cartesian velocity and acceleration limits are satisfied. It can thus be considered that these are projections of the Cartesian velocity and acceleration limits onto the coordinates of s.

Similarly, it is possible to have joint velocity and/or acceleration limits by using the function $h(s)=k^{-1}(f(s))$ instead of the function f in the preceding calculations.

D) Regulator (430)

The function of the regulator 430 is to generate movements along the curve 440, so as to keep the error variable as close as possible to zero 420.

The regulator used is of the integral type. A "conventional" integral regulator can be expressed in the following form:

$$d(sdes)/dt=K.eps$$

$$sdes=\int d(sdes)/dt.dt$$

where sdes is the desired position for the robot along the curve, expressed in the units of the parameter s in equation Eq. 1, and K is a constant. This is shown in the following block diagram, where p designates the Laplace variable:

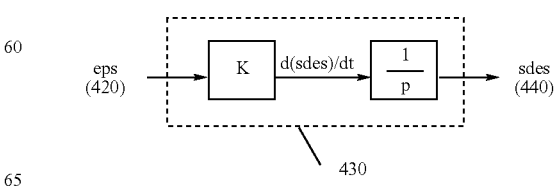

This diagram is equivalent to:

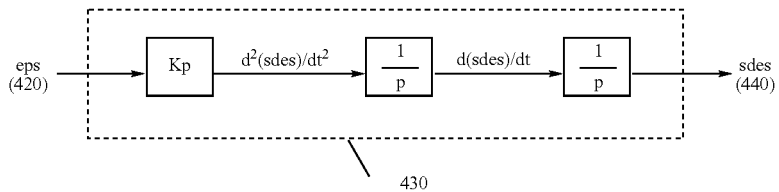

In order to include the velocity and acceleration limits, the diagram is modified as follows:

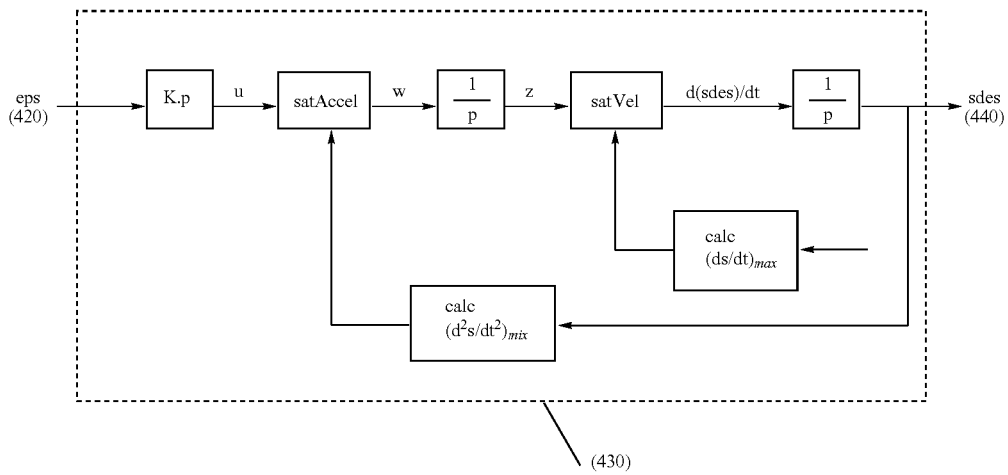

The block "calc $(ds/dt)_{max}$" and "calc $(d^2s/dt^2)_{max}$" calculates the speed of acceleration limits projected as a function of sdes as given by equations Eq. 5 and Eq. 6 (df/ds and $d^2f/ds^2$ are evaluated for s=sdes). The block satVel saturates the input velocity z as a function of $(ds/dt)_{max}$. In other words, the following applies:

$$d(sdes)/dt = \begin{cases} (ds/dt)_{max} & \text{if } z > (ds/dt)_{max} \\ z & \text{if } |z| \leq (ds/dt)_{max} \\ -(ds/dt)_{max} & \text{if } z < -(ds/dt)_{max} \end{cases}$$

Similarly, satAccel saturates the acceleration u as a function of $(d^2S/dt^2)$ max i.e.:

$$w = \begin{cases} (d^2s/dt^2)_{max} & \text{if } u > (d^2s/dt^2)_{max} \\ u & \text{if } |u| \leq (d^2s/dt^2)_{max} \\ -(d^2s/dt^2)_{max} & \text{if } u < -(d^2s/dt^2)_{max} \end{cases}$$

Under all circumstances, this scheme ensures that:

$|d(sdes)/dt| < (ds/dt)_{max}$ which guarantees that the norm of the desired Cartesian velocity along the path is less than vmax.

When the maximum velocity is not reached, then:

$z = d(sdes)/dt$ thus $w = d^2(sdes)/dt^2$ and $|d^2(sdes)/dt^2| < (d^2S/dt^2)_{max}$ which guarantees that the norm of the Cartesian acceleration is less than amax.

In a general context, the algorithm described ensures that the Cartesian velocity limit is always satisfied and that the acceleration limit is satisfied insofar as the maximum Cartesian velocity is not reached. For a straight line, when the velocity limit is reached, acceleration is zero, so the acceleration limit is satisfied.

E) Calculating (430) Movement Setpoints (500)

In this example, the movement setpoints 500 are the robot joint coordinates qdes. Starting from the desired position along the curve sdes, it is possible to calculate the corresponding Cartesian position setpoint by using the parametric equation for the curve as given by Eq. 1:

$xdes = f(sdes)$

Thereafter, the joint coordinates are obtained using the robot inverse geometrical model written $k^{-1}$:

$qdes = k^{-1}(xdes)$

If the movement setpoints were velocities, it would be possible to use the corresponding coordinate changes on velocities (equation Eq. 2 and the inverse of the robot kinematic matrix).

The invention claimed is:

1. A method of controlling the displacements of a moving portion of a multi-axis robot along a path, comprising:
   providing movement instructions to a path generator, the instructions including at least information relating to the shape of the path and to force setpoints;
   calculating an external force signal representing at least one component of the force exerted by said moving portion on its environment;
   acting at a predetermined sampling frequency to provide said external force signal to said path generator;
   calculating, with said path generator and at a predetermined sampling frequency, movement setpoints along said path, said movement setpoints minimizing the difference between the projection of the external force onto the tangent of the path and the projection of the force setpoint onto said tangent; and
   delivering said movement setpoints to a servo-control means enabling at least one axis of said robot to be set into movement in compliance with said movement setpoints.

2. The method according to claim 1, wherein said external force signal is calculated from information representing the current flowing in at least one actuator of said robot.

3. The method according to claim 1, including using a dynamic model of said robot while calculating said external force signal.

4. The method according to claim 1, including supplying said path generator with at least one velocity limit value and/or at least one acceleration limit value for taking into account while calculating said movement setpoints, such that said setpoints comply with said limit value(s).

5. Apparatus for controlling the displacements of a moving portion of a multi-axis robot along a path, comprising:
   a path generator suitable for calculating movement setpoints as a function of movement instructions including at least information relating to the shape of the path and to its force setpoints; and
   a force estimator suitable for generating an external force signal representing at least one component of the force exerted by said moving portion on its environment and for delivering said signal to said path generator at a predetermined sampling frequency, where said path generator is suitable for calculating said movement setpoints along said path at a predetermined sampling frequency in such a manner as to minimize the difference between the projection of the external force on the tangent to the path and the projection of the force setpoint onto said tangent, said movement setpoints being delivered to a servo-control means enabling at least one axis of said robot to be set into movement.

6. The apparatus according to claim 5, further including a program interpreter means suitable for executing programs containing movement instructions enabling at least the shape of the path and force setpoints to be specified.

* * * * *